G. Jepson,
Ice Pitcher.
Nº 83,969.  Patented Nov. 10, 1868.
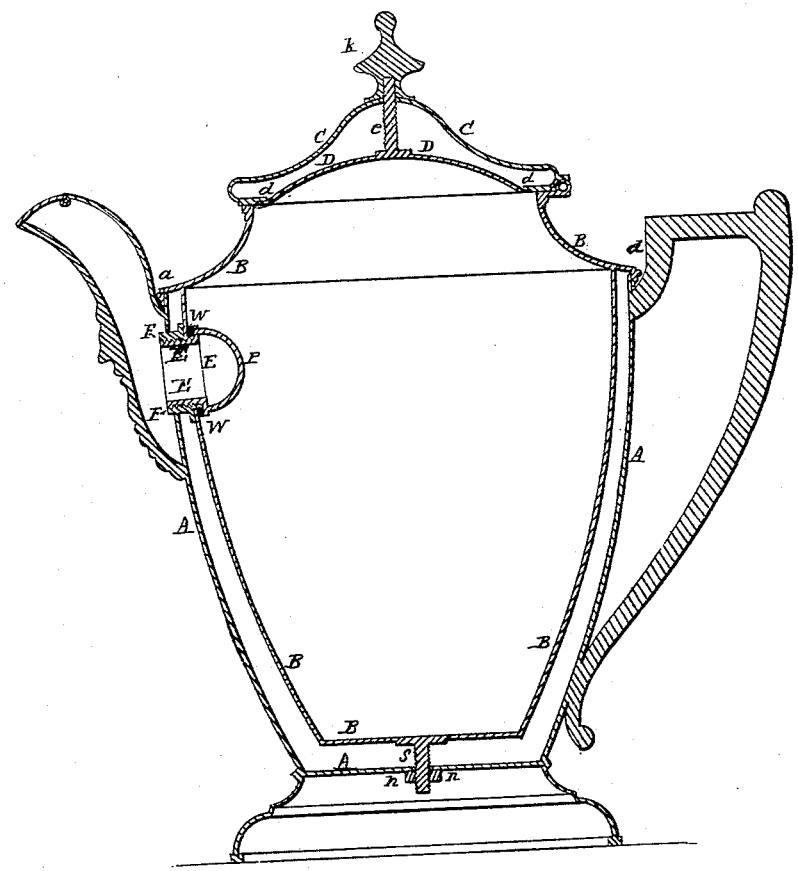
Witnesses:
J. E. Maynadier
Chas. F. Sleeper
Inventor.
Godfrey Jepson

GODFREY JEPSON, OF CHELSEA, MASSACHUSETTS, ASSIGNOR TO HIMSELF AND THOMAS F. BRYAN, OF SAME PLACE.

Letters Patent No. 83,969, dated November 10, 1868.

IMPROVED DOUBLE-WALLED PITCHER.

The Schedule referred to in these Letters Patent and making part of the same.

*To all whom it may concern:*

Be it known that I, GODFREY JEPSON, of Chelsea, in the county of Suffolk, and State of Massachusetts, have invented certain new and useful Improvements in "Double-Walled Pitchers;" and I do hereby declare that the following is a full, clear, and exact description of the same, reference being had to the accompanying drawings, making a part of this specification.

The object of my invention is to make a double-walled pitcher, with such a construction of its parts that it can readily be taken apart or put together, in order to be repaired or cleansed, and which will possess all the advantages of those in common use.

As now made, the inner and outer walls of most double-walled pitchers are soldered together at the points of connection, and when any repairs or cleaning are required, (such, for instance, as may arise from the inner wall becoming battered by the ice put in the pitcher, through some leak, which would allow the water to get between the walls, as is occasionally the case, and there decompose or rust the pitcher, making it offensive and unfit for use,) it is necessary to remove the solder to separate the parts, an operation which involves a considerable expenditure of time, and other expense, and the pitcher may be so much defaced as to require new plating.

My invention, by making the operation of separating and putting together the various portions of the pitcher very simple and easily understood, constitutes a great improvement upon such pitchers, as now made.

In the pitcher shown, the main body is in two parts or walls, A and B, constructed in the ordinary manner. A flange, $a$, from the inner wall B, covers the edge of the outer wall, as is usual in this style of pitcher. The two walls are held together by a screw, $s$, which is soldered to the bottom of the inner part, B, passes through the bottom of the part A, and is secured by a nut, $n$. The parts A and B are further connected by means of the flanged hollow screw E, which fits in a nut, F, the said nut being firmly secured to the part A, and having a flange, which impinges against the part B.

I put a packing, $w$, of leather, rubber, or some similar material, between the flange, on the screw E, and the inside of the part B, so that when the screw is fixed in its place, no water can enter between the parts A and B.

The curved portion $p$ (shown in the drawing) of the hollow screw, is a wire, fastened at its ends to the screw, and used as a handle in tightening it.

In some styles of pitcher this connection last mentioned would be sufficient to hold the parts A and B together without the aid of the screw $s$.

The cover is made in two parts, C and D, the part C being hinged to the wall B of the main body. They are held together, at the flanged joint $d$, by means of the screw $e$, which is fastened to the part D, passes through the part C, and into the nut $k$, as shown by the drawings.

I do not claim, broadly, uniting the walls of pitchers without solder, nor uniting them by means of screws generally, as I am aware that a method of uniting them, by means of a screw-thread cut into one wall, and a corresponding thread cut into the other wall of the pitcher, has been patented.

Nor do I claim the combination of the hollow screw and nut E and F, and washer W, however arranged; but What I do claim as my invention, and desire to secure by Letters Patent, is—

The arrangement of the hollow flanged screw E, hollow flanged nut F, and washer W, with the outer and inner walls of a double-walled pitcher, substantially as and for the purpose specified.

GODFREY JEPSON.

Witnesses:
J. E. MAYNADIER,
CHAS. F. SLEEPER.